United States Patent [19]

Kawamura et al.

[11] Patent Number: 4,864,174
[45] Date of Patent: Sep. 5, 1989

[54] GENERATOR DEVICE

[75] Inventors: Hideo Kawamura, Kanagawa; Tadashi Fukao, Yokohama, both of Japan

[73] Assignee: Isuzu Motors Limited, Shinagawa, Japan

[21] Appl. No.: 245,946

[22] Filed: Sep. 19, 1988

Related U.S. Application Data

[63] Continuation of Ser. No. 115,619, Oct. 30, 1987, abandoned, which is a continuation of Ser. No. 712,440, Mar. 18, 1985, abandoned.

[30] Foreign Application Priority Data

Mar. 17, 1984 [JP] Japan .................................. 59-51557
Mar. 22, 1984 [JP] Japan .................................. 59-54737

[51] Int. Cl.$^4$ .......................................... H02K 21/12
[52] U.S. Cl. ..................................... 310/156; 310/43; 310/112; 310/261; 290/52
[58] Field of Search ............. 310/261, 265, 152, 156, 310/164, 112, 171, 218, 40 MM, 43, 216, 269, 262, 264, 267, 168, 169, 170, 75 R; 290/52, 54

[56] References Cited

U.S. PATENT DOCUMENTS

| | | | |
|---|---|---|---|
| 2,299,589 | 10/1942 | Reis .................................... | 310/156 |
| 2,306,360 | 12/1942 | Stuart .................................. | 310/156 |
| 2,488,729 | 11/1949 | Kooyman .......................... | 310/156 |
| 3,740,630 | 6/1973 | Jarret ................................. | 310/163 |
| 4,253,031 | 2/1981 | Frister ............................... | 290/52 |
| 4,362,020 | 12/1982 | Meacher ............................ | 290/52 |
| 4,394,582 | 7/1983 | Kreissl .............................. | 290/52 |
| 4,433,261 | 2/1984 | Nashiki .............................. | 310/156 |
| 4,562,641 | 1/1986 | Mosher .............................. | 310/156 |
| 4,571,516 | 2/1986 | Schneiter ........................... | 310/156 |
| 4,614,888 | 9/1986 | Mosher .............................. | 310/261 |

FOREIGN PATENT DOCUMENTS

| | | | |
|---|---|---|---|
| 0141634 | 5/1985 | European Pat. Off. . | |
| 479238 | 7/1929 | Fed. Rep. of Germany . | |
| 731484 | 1/1943 | Fed. Rep. of Germany . | |
| 1638445 | 8/1971 | Fed. Rep. of Germany . | |
| 2047108 | 3/1972 | Fed. Rep. of Germany . | |
| 3225388 | 1/1984 | Fed. Rep. of Germany . | |
| 520856 | 7/1921 | France . | |
| 0899881 | 6/1945 | France .............................. | 310/156 |
| 1504565 | 12/1967 | France . | |
| 2075586 | 10/1971 | France . | |
| 2185884 | 1/1974 | France . | |

OTHER PUBLICATIONS

European Search Report, The Hague, Examiner: K. H. Tio.

*Primary Examiner*—R. Skudy
*Attorney, Agent, or Firm*—Staas & Halsey

[57] ABSTRACT

A generator device has a reluctance generator. The reluctance generator comprises stator coils and an I-shaped rotor. The stator coils includes a winding phase for being supplied with a 90°-leading armature current to generate a no-load induced electromotive force. The I-shaped rotor has an extremely small magnetic reluctance in a first direction normal to a rotational axis thereof and a large magnetic reluctance in a second direction normal to the first direction.

5 Claims, 6 Drawing Sheets

Fig. 4
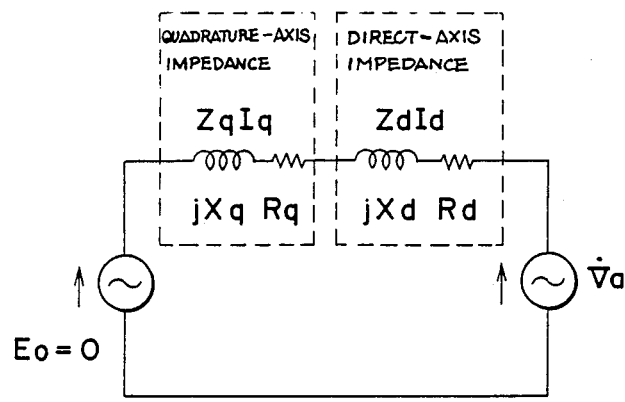
Fig. 5
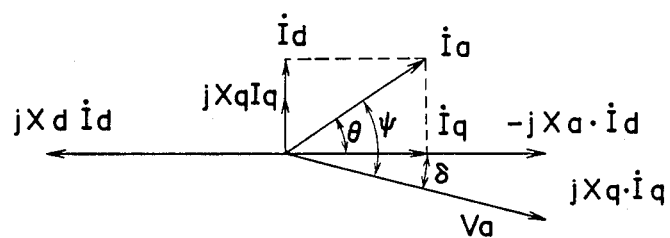
Fig. 6a   Fig. 6b
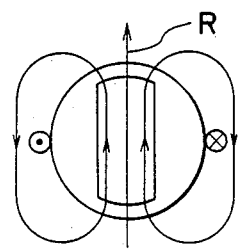 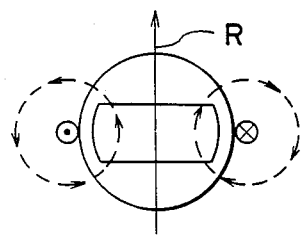

GENERATOR DEVICE

This is a continuation of co-pending application Ser. No. 115,619 filed on 10/30/87, which is a continuation of Ser. No. 712,440, filed Mar. 18, 1985, both now abandoned.

BACKGROUND OF THE INVENTION

The present invention relates to a generator device having a reluctance generator coupled to an exhaust gas turbine of an internal combustion engine, for example.

There has heretofore been an attempt to drive a generator with an exhaust-gas turbine installed on an internal combustion engine to recover generated electric power for use as a power supply for various loads in an automobile.

The generator used in such an arrangement is generally of the induction type in which no current is passed through the rotor. The reason for using the induction generator is that with a general synchronous generator, there are employed a rotor with coils and brushes interposed between the rotor and a field current supply for supplying currents to the rotor coils from a fixed side, and the brushes would fail to be mechanically strong sufficiently on high-speed rotation of the rotor and would be worn or broken so that no electric power could be picked up.

The induction generator is however suitable for high-speed rotation as no current is passed through the rotor, and is effective for use as a generator which operates at several tens of thousands revolutions per minute.

Where the generator is to be used with an exhaust-gas turbine of an internal combustion engine, however, difficulty would be experienced in installing the generator device including such generator in the engine compartment since the generator device is of an increased volume.

With the induction generator, especially with a squirrel-cage rotor which lends itself to high-speed rotation, the rotor is of an integral construction including secondary conductors and short-circuit rings connecting the ends of the second conductors, the secondary conductors and the short-circuit rings being formed by casting aluminum in an iron core. On high-speed rotation, the rotor is subjected to undue centrifugal forces acting on the entire circumference thereof to cause the secondary conductors to come gradually off the iron core and the short-circuit rings until finally the rotor will be destroyed.

SUMMARY OF THE INVENTION

It is an object of the present invention to provide a generator device which is of a compact size with a reluctance generator attached to an exhaust-gas turbine and can be installed in an engine compartment of an automobile.

Another object of the present invention is to provide a generator device having a reluctance generator including a rotor which has a stable mechanical strength against ultrahigh-speed rotation.

According to the present invention, there is provided a generator device having a reluctance generator comprising stator coils including a winding phase for being supplied with a 90°-leading armature current to generate a no-load induced electromotive force, and a substantially I-shaped rotor having an extremely small magnetic reluctance in a first direction normal to a rotational axis and a large magnetic reluctance in a second direction normal to the first direction.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is an equivalent circuit diagram of a reluctance generator;

FIG. 5 is a diagram of voltage and current vectors in an equivalent circuit of the reluctance generator;

FIGS. 6a and 6b are diagrams showing the relationship between angular positions of a rotor and a winding axis;

DESCRIPTION OF THE PREFERRED EMBODIMENTS

The principles of a reluctance generator according to the present invention will first be described, and then preferred examples of generators constructed on those principles will be described.

Figure 1A:
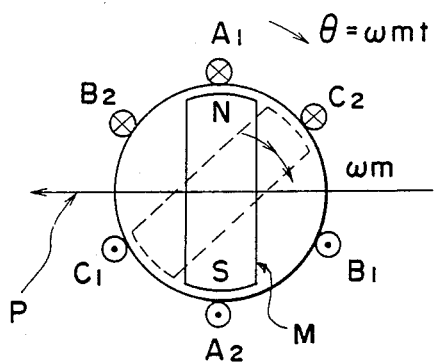
FIGS. 1a and 1b are diagrams illustrative of the principles of a three-phase synchronous generator.
Figure 1B:
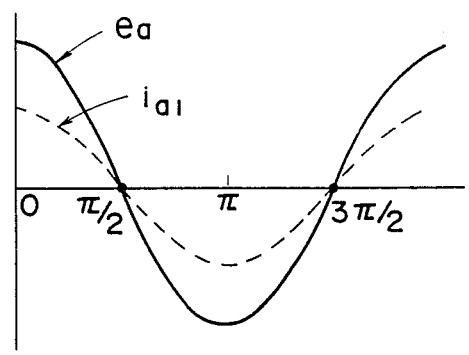

FIGS. 1a and 1b show the principles of a three-phase synchronous generator and the waveshape of an electromotive force induced. An I-shaped rotor M composed of a permanent magnet is rotatable in phase coils $A_1-A_2$, $B_1-B_2$, and $C_1-C_2$. When the rotor M is in the illustrated position, electromotive forces induced in the coils are directed as shown in FIG. 1a, and at this time the electromotive force ea in the coil $A_1-A_2$ is maximum.

When a load is put on the generator and an armature current $ia_1$ flows in phase with the electromotive force ea, the current in the phase coils coincides with the electromotive force distribution shown in FIG. 1b at $\theta=0$ since the current and voltage in each phase are held in phase with each other. The armature current generates a magnetomotive force across the gap in the direction of the arrow P in FIG. 1a.

Thus, if the electromotive force ea and the armature current $ia_1$ are in phase with each other, then the magnetomotive force is generated by the armature current and lags a magnetic flux produced by the field coils by a phase angle of 90°.

Figure 2A:
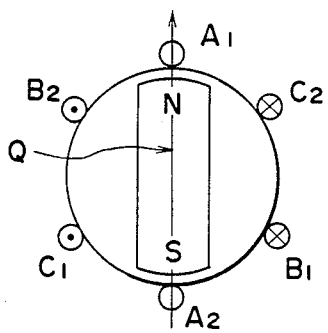
FIGS. 2a and 2b are diagrams illustrative of the principles of a reluctance generator according to the present invention.
Figure 2B:
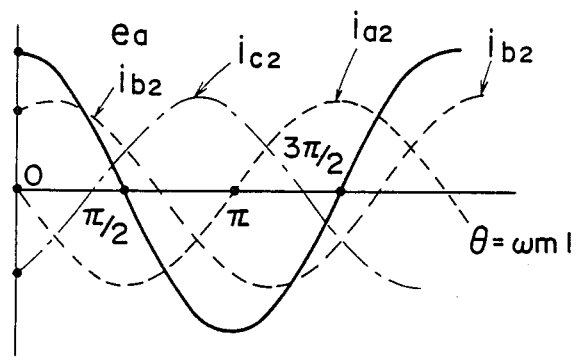

Therefore, when currents $ia_2$, $ib_2$, $ic_2$ (FIG. 2b) are passed which lead the no-load induced electromotive force ea by 90°, the current $ia_2$ leading the electromotive force ea by 90° flows through the coil $A_1-A_2$, and the magnetomotive force due to the current $i_{a2}$ falls to zero at $\theta=0$. However, a magnetomotive force is generated by the currents $i_{b2}$, $i_{c2}$ in the direction of the arrow Q (FIG. 2a) which is the same direction as that of the field flux, thereby increasing the field flux.

As a result, the process of generating currents leading the no-load induced electromotive force by 90° at all times and continuously changing the magnitudes of the currents is equivalent to an ordinary process of regulating the field current in the synchronous generator. It follows that a generator having the same function as the synchronous generator can be achieved without field coils and a permanent magnet. Such a generator has a reduced power factor as both load and field currents have to be passed through the armature coils.

Figure 3:
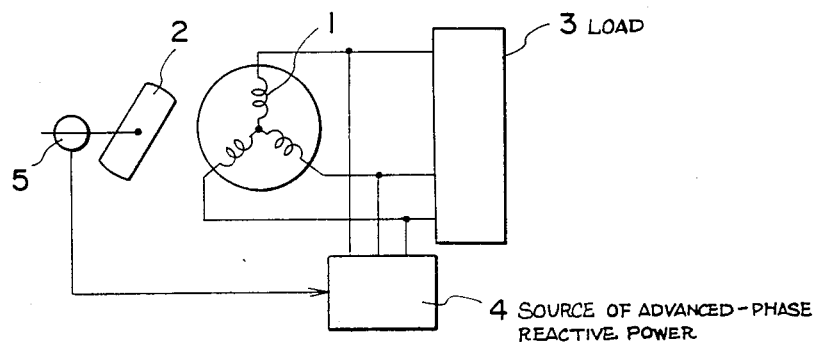
FIG. 3 is a circuit diagram of a control circuit for a three-phase synchronous generator.

FIG. 3 shows a control circuit for a reluctance generator. Designated at 1 are armature coils of the generator, 2 a rotor, 3 a load, 4 a source of advanced-phase reactive power, and 5 a rotor position sensor for detecting the angular position of the rotor 2 at all times and enabling the source 4 to supply excitation currents to the armature coils 1. When the rotor 2 is rotated, electromotive forces are induced in the armature coils 1 to supply electric power to the load 3.

As is apparent from the above principles of operation, the reluctance generator is the same as an ordinary salient-pole synchronous generator from which the field winding has been removed. The reluctance generator has an equivalent circuit as shown in FIG. 4 in which an electromotive force $E_0$ generated by a main flux due to the field winding in the salient-pole generator is zero.

Now, an analysis will be made to determine how the generator output is affected by Xq, Xd where the counter-electromotive force generated by connection to the load 3 is indicated by Va. For simplifying the analysis of operation of the generator, winding resistances Rq, Rd are neglected, and an quadrature-axis impedance Zq is regarded as being equal to jXq while a direct-axis impedance Zd is regarded as being equal to jXd. The vector diagram as shown in FIG. 5 is then plotted.

In FIG. 5, $$Ia \cdot \cos\theta = Iq \quad (1)$$

$$Ia \cdot \sin\theta = Id \quad (2)$$

$$Va \cdot \cos\delta = Xd \cdot Id \quad (3)$$

$$Va \cdot \sin\delta = Xq \cdot Iq \quad (4)$$

One-phase output Pph is given by:

$$Pph = Va \cdot Ia \cdot \cos\psi \quad (5)$$
$$= Va \cdot Ia \cdot \cos(\theta + \delta)$$

By modifying the equation (5), $$Pph = \frac{1}{2}(1-\alpha)Xd \cdot Ia^2 \sin 2\theta \quad (6)$$

With $\alpha = Xq/Xd$ and by modifying the equation (6) based on the equations (1) through (4), $$Va = Xd \cdot Ia \sqrt{\sin^2\theta + \alpha^2 \cos^2\theta} \quad (7)$$

The one-phase output Pph then becomes:

$$Pph = \frac{(1-\alpha)\sin^2\theta}{2\sqrt{\sin^2\theta + \alpha^2 \cos^2\theta}} Va \cdot Ia = K_1 Va \cdot Ia \quad (8)$$

In order to increase the output Pph, Xd should be increased to as large an extent as possible and Xq should be reduced to as small an extent as possible since Ia is an allowable current for the coils and can be suppressed, in view of the equation (6).

Thus, when the angular position of the rotor coincides with the direction of the coil axis as shown in FIG. 6a, then the magnetic flux generated by the coil passes in the direction of the solid-line arrow R, so that the magnetic path has a small magnetic reluctance and the coil has an increased self-inductance $L_1$. When the angular position of the rotor is normal to the coil axis as illustrated in FIG. 6b, then the magnetic path has a large magnetic reluctance and the coil has a reduced inductance $L_2$. Therefore, $$Xd = 3/2\omega L_1 \quad (9)$$

$$Xq = 3/2\omega L_2 \quad (10)$$

Figure 7:
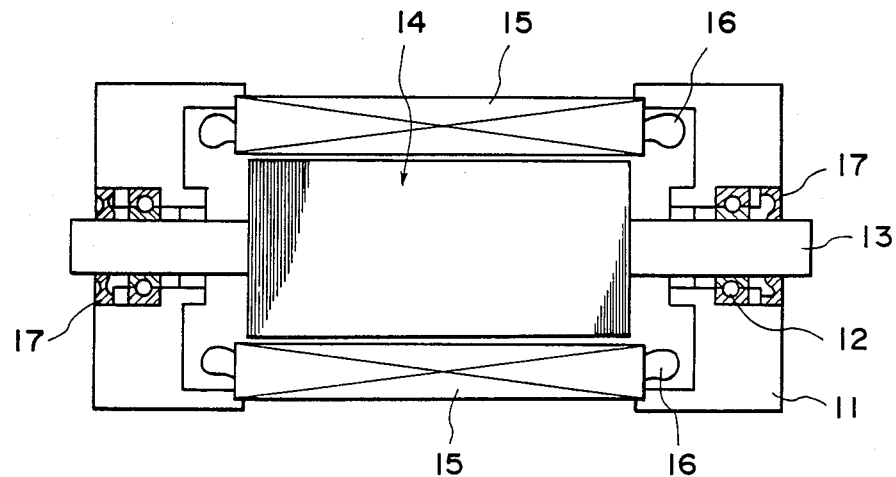
FIG. 7 is a longitudinal cross-sectional view of a reluctance generator.
Figure 8:
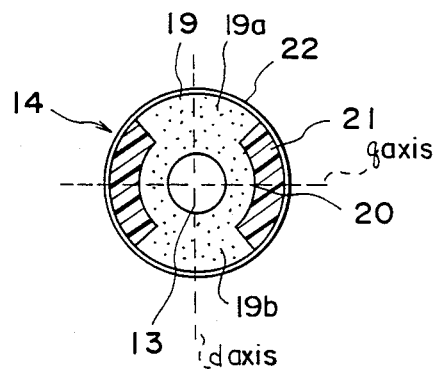
FIG. 8 is a transverse cross-sectional view of a rotor according to the present invention.

FIGS. 7 and 8 illustrate a reluctance generator constructed on the basis of the above principles. The rotor in the reluctance generator should preferably be shaped such that $\alpha$ is reduced if the magnetic reluctance is small in the direction of a d-axis and large in the direction of a q-axis.

A shaft 13 is rotatably supported at its opposite ends by bearings 12 in a housing 11, and a rotor 14 is mounted on the shaft 13. Stator cores 15 and stator coils 16 are mounted on the housing 11 radially outwardly of the rotor 14. Designated at 17 are seal rings.

The rotor 14 has c circumference and comprises a silicon-steel block having a substantially I-shaped cross section and exhibits strong magnetism in the direction of a longer diameter and weak magnetism in the direction of a shorter diameter. With this arrangement, the magnetic reluctance is small in the longer-diameter direction and large in the shorter-diameter direction, with the result that the value of $\alpha$ is small and the output Pph is sufficiently large.

The rotor 14 has a pair of diametrically opposite arcuate portions 19 in which $\alpha_1 = 90°$. The rotor 14 has a thickness, near the shaft 13, which is substantially the same as that of the arcuate portions 19. This dimension is employed to prevent the flux path from being narrowed by the shaft 13 and hence prevent the magnetic reluctance from being increased.

The rotor 14 also includes a wedge shaped nonarcuate portion 20 between the arcuate portions 19. Wedged shaped dummy fillers 21 are joined to the wedge shaped nonarcuate portions 20 and present arcuate surfaces which smoothly blend into the arcuate portions 19 to form the remaining part of the circumference of the rotor as shown in FIG. 8. The wedge shaped dummy fillers 21 are formed of hard and lightweight synthetic resin.

The entire outer circumferential surface of the rotor 14 is covered with a layer 22 of carbon fibers which has a high tensile strength and does not prevent the generation of magnetism. The layer 22 provides a smooth outer circular surface for preventing windage loss and prevents separation of the fillers 21 and flexing of the core under centrifugal forces applied to the rotor 14.

The clearance between the stator cores 15 and the shaft 13 should preferably be as small as possible in order to produce the difference between the magnetic reluctances referred to above.

Figure 10:
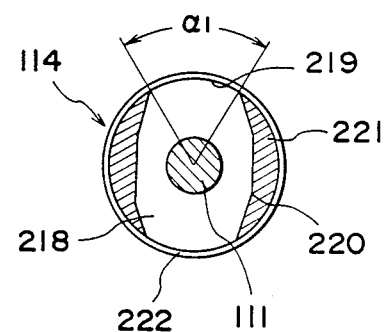
FIG. 10 is a transverse cross-sectional view of a rotor according to another embodiment of the present invention.
Figure 9:
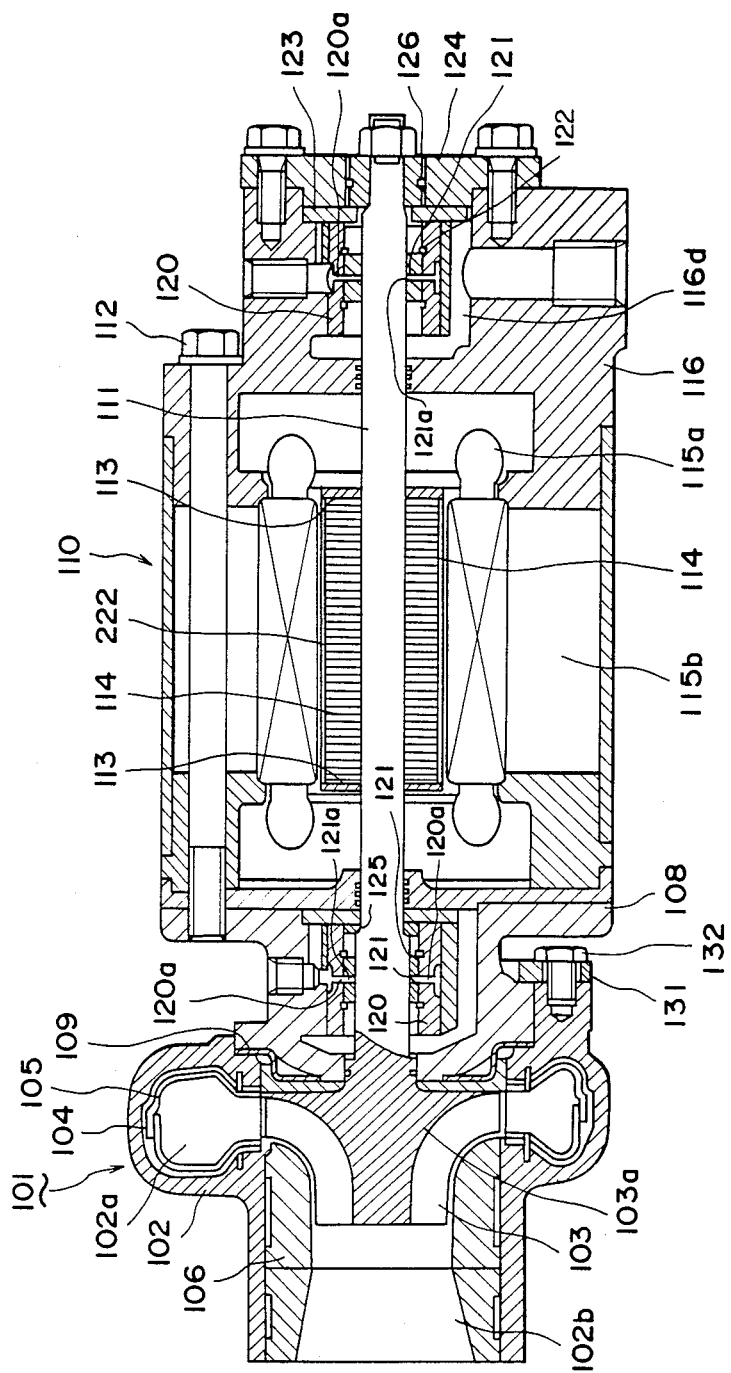
FIG. 9 is a longitudinal cross-sectional view of a generator device according to an embodiment of the present invention, employing a reluctance generator.

A specific arrangement of a generator device employing a reluctance generator and a rotor of another embodiment will be described with reference to FIGS. 9 and 10. In FIG. 9, an exhaust-gas turbine 101 is composed of a turbine housing 102 having a scroll 102a and a turbine impeller 103 rotatably disposed in the housing 102. The scroll 102a is connected to an exhaust pipe of an internal combustion engine. The turbine impeller 103 is rotated by the energy of an exhaust gas introduced from the exhaust pipe into the scroll 102a. The exhaust gas, after having rotated the turbine impeller 103, is discharged out of an axial exhaust outlet port 102b into an exhaust pipe (not shown).

The inner wall surface of the scroll 102a is lined with a heat-insulating material 104 such as ceramic fibers and a heat-insulating wall 105 of a heat-insulating metal such as stainless steel. The housing 102 has an exhaust tube accommodating therein a heat-insulating guide 106 as of ceramic fibers attached to the inner surface of the exhaust tube for preventing thermal radiation from the exhaust gas.

The turbine impeller has an integral impeller shaft 103a. The impeller shaft 103a and a rotor shaft 111 of a generator 110 are integrally formed of metal. The turbine impeller and the rotor shaft 111 may however be integrally formed of a ceramic material such as cermet having a large Young's modulus for preventing the turbine impeller from being deformed under centrifucal forces due to an unbalanced mass of the turbine impeller at the time the rotor shaft 111 rotates at a high speed.

A bearing housing 108 is mounted on an end of the turbine housing 102 remote from the outlet port 102b with a heat-insulating member 109 interposed. The bearing housing 108 is secured to a fastening plate 131 attached to the turbine housing 102 by a bolt 132. The generator 110 is attached to the bearing housing 108 by a bolt 112.

The generator 110 comprises the rotor shaft 111, a rotor 114 fixedly fitted over the rotor shaft 111, stator coils 115 and stator cores 115b disposed radially outwardly of the rotor 114 in confronting relation to each other, and a bearing housing 116 in which one end of the rotor shaft 111 is rotatably supported.

The rotor 114 of an embodiment different from the embodiment of FIG. 8 has a laminated core 218 composed of a number of silicon-steel plates of a substantially I shape which are welded together. The rotor 114 exhibits strong magnetism in the direction of a longer diameter and weak magnetism in the direction of a shorter diameter. Stated otherwise, the magnetic reluctance is small in the longer-diameter direction and large in the shorter-diameter direction, with the result that the value of $\alpha$ is small and the output $P_{ph}$ is sufficiently large.

The substantially I-shaped laminated core 218 has a pair of diametrically opposite arcuate portions 219 in which $\alpha_1 = 90°$ and has a thickness in the vicinity of the rotor shaft 111 which is of the same dimension as that of the arcuate portions 219. With this dimension, the flux path is prevented from being narrowed by the rotor shaft 111 and hence the magnetic reluctance is prevented from being increased. The laminated core 218 is held together by holder members 113 at opposite ends thereof.

The rotor 114 also includes a nonarcuate portion 220 between the arcuate portions 219. Dummy fillers 221 are joined to the nonarcuate portions 220 and present arcuate surfaces which smoothly blend into the arcuate portions 119. The dummy fillers 221 are formed of hard and lightweight synthetic resin.

The outer circumferential surface of the rotor 114 is covered with a nonmagnetic metal sheet 222 as of stainless steel or a titanium alloy. The sheet 222 provides a smooth outer circular surface for preventing windage loss and prevents separation of the fillers 221 and flexing of the laminated core 218 under centrifugal forces applied to the rotor 114. The clearance between the stator cores 115b and the rotor shaft 111 should preferably be as small as possible, or at least the fillers 221 should preferably of a thickness as small as possible in the longer-diameter direction, in order to produce the difference between the magnetic reluctances referred to above.

With the reluctance generator of the above construction, it is not necessary to pick up electric power from the rotating part, and the weight of the rotor is not as large as that of the conventional induction generator. Therefore, the reluctance generator of the invention is capable of rotation at ultrahigh speeds.

Since the reluctance generator can generate sufficiently high electric power due to ultrahigh-speed rotation, the generator can be driven at high speed by the exhaust-gas turbine 101 to generate electric power which will be utilized for energizing automobile loads.

Although the rotor 114 is illustrated as being composed of silicon-steel layer sheets, the rotor 114 may comprise a silicon-steel block having a substantially I-shaped block having a smaller magnetic reluctance in the longer-diameter direction and a larger magnetic reluctance in the shorter-diameter direction. The rotor 114 of soft iron may serve the purpose to a certain extent.

The rotor 114 may be composed only of the laminated core 218, without providing a smooth outer circular circumferential surface. Although the rotor 114 of such a modification suffers windage loss, it can easily be fabricated.

Each of the bearing housings 108, 116 accommodates therein a fixed bearing 120 and a floating bearing 121. The floating bearings 121 support opposite ends of the rotor shaft 111 rotatably therein and are rotatably disposed in the fixed bearings 120, respectively. The fixed and floating bearings 120, 121 have lubricant oil passages 120a, 121a, respectively, for lubricating and cooling the sliding surfaces between the bearings 120, 121 and the sliding surfaces between the floating bearings 121 and the rotor shaft 111.

The floating bearings 121 are prevented from being axially moved by snap rings 122. Designated at 123 is a thrust bearing for the rotor shaft 111, 125 a positioning ring, 124 a cover covering the bearings on the righthand end (in FIG. 9) of the rotor shaft 111, and 126 an oil seal ring.

In operation, an exhaust gas from the internal combustion engine is introduced into the scroll 102a of the exhaust-gas turbine 101, acts on the turbine impeller 103, and is discharged out of the outlet port 102b, during which time the turbine impeller 103 is rotated at a high speed by the energy of the exhaust gas. The rotation of the turbine impeller 103 is transmitted directly to the rotor shaft 111 integral with the turbine impeller shaft 103a. The rotor 114 is therefore rotated at a high speed for efficient electric power generation.

Where the turbine impeller 103, the impeller shaft 103a, and the rotor shaft 111 are formed of a ceramic material, the rotating parts as a whole are reduced in weight for effective prevention of deformation of the shafts 103a, 111 under centrifucal forces imposed thereon. Particularly in case the rotor shaft 111 is of a ceramic material having a large Young's modulus, any deformation thereof can be held to a minimum.

In the event that the turbine impeller 103, the impeller shaft 103a, and the rotor shaft 111 are integrally formed of a ceramic material, they are not required to be separately fabricated and then assembled together, and the resultant construction is less subjected to troubles or damages.

With the arrangement of the present invention, since the reluctance generator is mounted on the turbine shaft, the entire construction is compact in size and can be accommodated in an engine compartment of an automobile.

As described above, the substantially I-shaped silicon-steel rotor having an extremely small magnetic reluctance in a direction normal to the angular axis thereof and a large magnetic reluctance in a direction normal to the above direction, is disposed in the stator coils including a winding phase supplied with a 90°-leading armature current for generating a no-load induced electromotive force. With this construction, a large electric power can be induced in the armature coils without employing field coils and a permanent magnet. The rotor includes a nonarcuate portion to which dummy fillers are joined to present arcuate surfaces, and a layer of carbon fibers is placed in covering relation to the entire outer circumferential surface of the rotor. The rotor thus constructed holds windage loss to a minimum while maintaining desired magnetic characteristics. Therefore, there can be provided a generator of a compact size and a low cost which is capable of withstanding high-speed rotation.

Although certain preferred embodiments have been shown and described, it should be understood that many changes and modifications may be made therein without departing from the scope of the appended claims.

What we claim is:

1. A generator device having a reluctance generator drivable by exhaust energy from an internal combustion engine, comprising:
    an impeller shaft rotatable by the exhaust energy from the internal combustion engine;
    a rotor shaft integrally construed with said impeller shaft;
    a circular rotor having a circumference and a substantially I-shaped solid cross sectional part with arcuate portions forming a part of the circumference and wedge shaped non-arcuate portions mounted on said rotor shaft and having a magnetic reluctance in a first direction normal to an axis of said rotor shaft and a smaller magnetic reluctance in a second direction normal to said first direction and to the axis of said rotor shaft, said rotor having a thickness in the first direction across said wedge shaped non-arcuate portions being substantially the same as a thickness of said arcuate portions in the first direction;
    wedge shaped dummy fillers joined to said wedge shaped non-arcuate portions of said rotor so as to form the remaining part of the circumference of the rotor; and
    stator coils disposed around said rotor.

2. A generator device according to claim 1, wherein said rotor comprises silicon steel.

3. A generator device according to claim 1, wherein said dummy fillers are of hard synthetic resin.

4. A generator device according to claim 1, including a layer of carbon fibers covering an entire outer circumferential surface of said rotor, including said arcuate portions.

5. A generator device according to claim 1, including a nonmagnetic metal sheet covering an entire outer circumferential surface of said rotor, including said arcuate portions.

* * * * *